United States Patent
Trautenberg

(12)
(10) Patent No.: US 8,199,692 B2
(45) Date of Patent: Jun. 12, 2012

(54) METHOD AND DEVICE FOR EFFICIENT DISSEMINATION OF INFORMATION IN A SATELLITE NAVIGATION SYSTEM

(75) Inventor: Hans L. Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 793 days.

(21) Appl. No.: 12/237,696

(22) Filed: Sep. 25, 2008

(65) Prior Publication Data

US 2009/0080367 A1  Mar. 26, 2009

(30) Foreign Application Priority Data

Sep. 26, 2007 (DE) .......................... 10 2007 046 254

(51) Int. Cl.
*H04B 7/185* (2006.01)
*G01S 19/00* (2010.01)

(52) U.S. Cl. ..................................... 370/316; 342/357.2
(58) Field of Classification Search .................. None
See application file for complete search history.

(56) References Cited

U.S. PATENT DOCUMENTS

| | | | |
|---|---|---|---|
| 5,017,925 A * | 5/1991 | Bertiger et al. | 342/352 |
| 5,490,076 A | 2/1996 | Rawicz et al. | |
| 5,619,211 A * | 4/1997 | Horkin et al. | 342/357.21 |
| 5,841,398 A | 11/1998 | Brock | |
| 5,999,125 A | 12/1999 | Kurby | |
| 6,169,522 B1 * | 1/2001 | Ma et al. | 343/853 |
| 6,603,426 B1 * | 8/2003 | Clark | 342/357.64 |
| 7,400,292 B2 * | 7/2008 | DiLellio | 342/357.31 |
| 2005/0093739 A1 | 5/2005 | DiLellio | |
| 2005/0237253 A1 * | 10/2005 | Kuo et al. | 343/772 |
| 2007/0085735 A1 * | 4/2007 | Bay | 342/357.02 |

FOREIGN PATENT DOCUMENTS

| | | |
|---|---|---|
| DE | 195 37 923 A1 | 4/1997 |
| DE | 197 31 702 A1 | 4/1998 |
| EP | 1 777 538 A1 | 4/2007 |

OTHER PUBLICATIONS

European Search Report dated Jan. 29, 2009 including portion translated in English (Eight (8) pages).
German Office Action dated May 30, 2008 including an English translation (Seven (7) pages).

* cited by examiner

*Primary Examiner* — Clemence Han
(74) *Attorney, Agent, or Firm* — Crowell & Moring LLP

(57) ABSTRACT

A system and method for the efficient dissemination of information in a satellite navigation system is provided. The system includes a satellite system comprising a plurality of satellites, a network of observation stations for observing the signals of the satellites, one or more redundant central processing center(s) for evaluating the observations of the observation stations and for generating information, based on the observations, for the dissemination to utilization systems, and a communication network for transmitting the observations from the observation stations to the one or more redundant central processing center(s). The one or more redundant central processing center(s) send(s) the information to the selected satellites, and upon receiving the information, each of the selected satellites sends this information to the neighboring satellites.

17 Claims, 1 Drawing Sheet

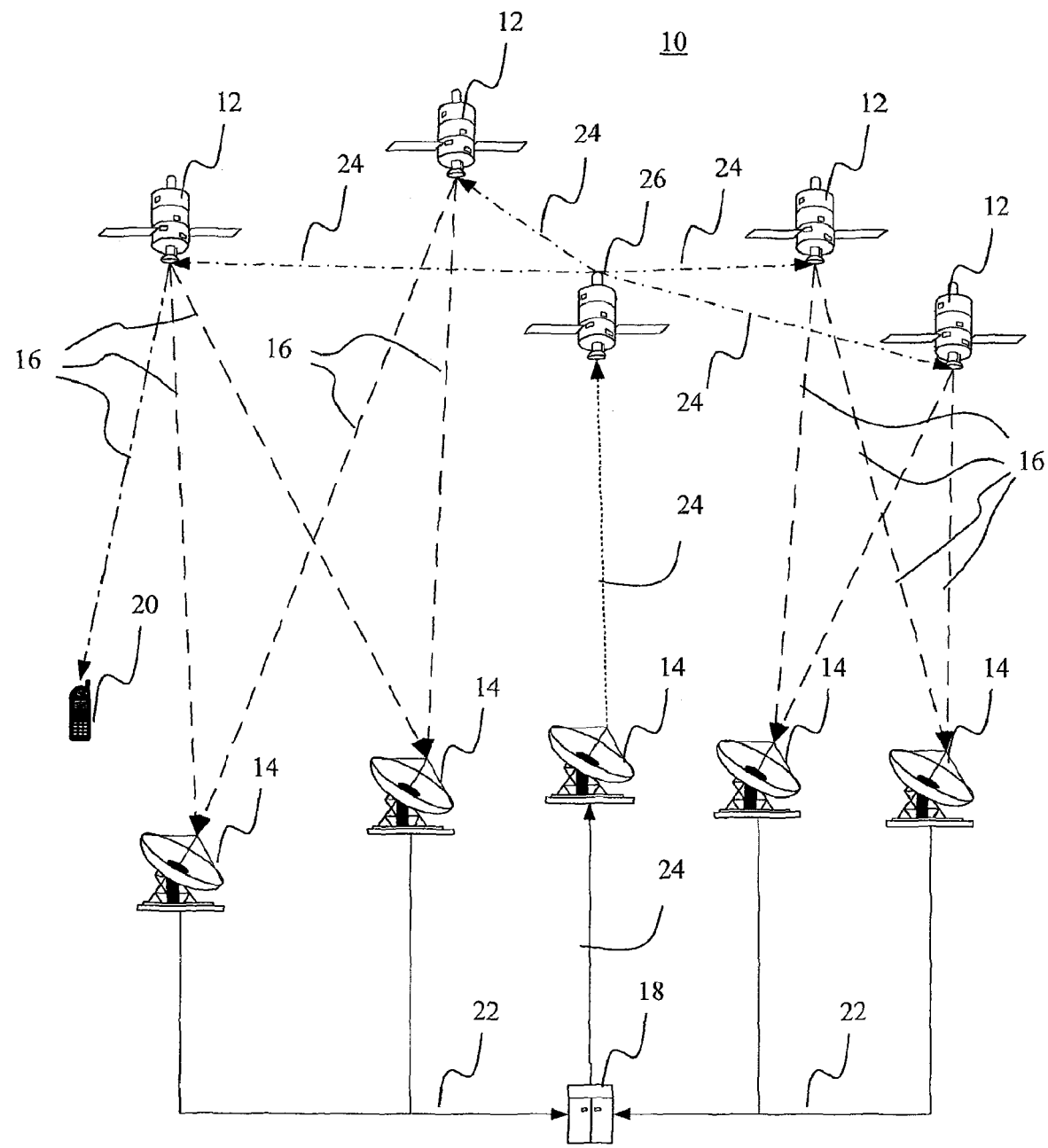

METHOD AND DEVICE FOR EFFICIENT DISSEMINATION OF INFORMATION IN A SATELLITE NAVIGATION SYSTEM

CROSS REFERENCE TO RELATED APPLICATIONS

This application claims priority under 35 U.S.C. §119 to German Patent Application No. 10 2007 046 254.0-35, filed Sep. 26, 2007, the entire disclosure of which is herein expressly incorporated by reference.

BACKGROUND AND SUMMARY OF THE INVENTION

The invention relates to a method for the efficient dissemination of information in a satellite navigation system.

Satellite systems for global navigation (GNSS; GNSS=global navigation satellite system) and/or satellite navigation systems are used for position finding and for navigation on the ground and in the air. GNSS systems, such as the European satellite navigation system that is currently under construction (hereinafter referred to as the Galileo system or simply Galileo), comprise a plurality of satellites, an earth-based receiver system, which is connected to one or more central processing center(s), of observation systems (ground infrastructure), and utilization systems, which evaluate and use the satellite signals, transmitted by radio from the satellites, in particular for navigation. In a satellite navigation system there is a continuous exchange of information between the satellites and the ground infrastructure as well as within the components of the ground infrastructure, in order to guarantee a reliable and continuous operation of the satellite navigation system. In this respect it is especially important that information about the availability of the system arrives at the utilization systems without prolonged time delays, in order, for example, to warn the users about faulty signals, which could have an adverse effect on the accurate detection of a user's position.

An accurate position detection demands both local as well as global integrity in the satellite navigation system. Integrity means in particular that the satellite navigation system is capable of warning a user within a certain period of time when parts of the system are not to be used for the navigation—for example, in the event of a failure or behavior outside the specification or prediction of system components—and that the user can trust the navigation data, which is received from the satellites of the system by way of the satellite navigation signals. In particular, the user can rely on the accuracy of the received navigation data.

Prior art integrity concepts include the integrity concept of Galileo, the Wide Area Augmentation System (WAAS) and the European Geostationary Navigation Overlay Service (EGNOS). These integrity concepts demand a very comprehensive ground-based infrastructure in order to find an error in the navigation signals and then to warn the user in time. The ground-based infrastructure is very expensive for several reasons:

a) In order to be able to find errors in the navigation signals, the past concepts needed a close meshed network of observation stations.

b) In order to be able to evaluate the observations of the observation stations at a central center, a real time communication network is needed between the observation stations and the central processing center.

c) The information determined at the central processing center is disseminated globally over a communication network, in order to then disseminate from the ground to the end user over the selected satellites.

Therefore, the present invention provides a method and a device for the efficient dissemination of information in a satellite navigation system.

This is achieved with a method for the efficient dissemination of information in a satellite navigation system as set forth in detail herein.

Exemplary embodiments of the present invention remove, from the system architecture, the demanding communication network for global dissemination of information determined by one or more central processing center(s) in order to simplify the ground infrastructure and, thus, make possible an efficient dissemination of information. At this point one approach for the dissemination of information to end users of the satellite navigation system includes, according to the invention, sending the information to be disseminated directly from a central processing center to selected satellites and passing the information from satellite to satellite until finally an adequate number of satellites can send the information to the utilization systems. This is performed to guarantee that the utilization systems are properly provided at a sufficiently high continuity with the information, especially for the integrity of the satellite navigation system. In addition to the considerably more efficient dissemination of information as compared to the prior art satellite navigation systems, the invention offers the advantage that ground-based communication networks, which are expensive to operate, can be simplified, in particular, decreased. In this context a ground-based communication network is also defined as a communication network that includes not only the cables and the radio relay links, but also communication over geostationary satellites.

One aspect of the invention involves a method for the efficient dissemination of information in a satellite navigation system, which includes a satellite system with a plurality of satellites, a network of observation stations for observing signals of the satellites, a central processing center for evaluating the observations of the observation stations and for generating information, based on the observations for dissemination to utilization systems, and a real time communication network for transmitting the observations from the observation stations to the central processing center.

The central processing center sends the information to selected satellites, and upon receiving the information, each of the selected satellites sends this information to the neighboring satellites.

In this way the information can be efficiently distributed in the satellite navigation system. Above all, the required ground-based infrastructure can be reduced and, thus, simplified.

According to another aspect of the invention, the selected satellites may be a subset of the satellites, which are directly visible from the central processing center, from the plurality of satellites.

Furthermore, one aspect of the invention provides that upon receiving the information, a selected satellite sends this information simultaneously to all of the satellites that are directly visible from the selected satellite. Accordingly, the time required for the dissemination of information is held to a minimum.

According to an additional aspect of the invention, a selected satellite can transmit the received information over an antenna, which has an antenna characteristic with a maximum in exactly or approximately the directions in which the neighboring satellites are the farthest away. Therefore, in contrast to a highly directive antenna, it is possible to disseminate the information in an efficient way to the neighboring satellites with as little technical complexity as possible.

According to one aspect of the invention, a selected satellite can transmit the received information over an antenna that is mounted on the earth side of the satellite. In this way it is possible to disseminate information to neighboring satellites that are at about the same orbital altitude as the satellite that is transmitting the information.

An additional increase in efficiency can be achieved by allowing a selected satellite to transmit, according to one aspect of the invention, the received information over several antennas. In this way the information can also be disseminated to the neighboring satellites that exhibit different orbital altitudes, in particular exhibit orbital altitudes that are different from the orbit of the satellites transmitting the information.

According to one aspect of the invention, each observation station can also evaluate a received satellite signal or several satellite signals or all of the receivable satellite signals of the satellite system and can send the information about the evaluation to all of the directly visible satellites, and each satellite can calculate its own integrity information using the received information.

Owing to the calculation of the integrity information in each receiving satellite, there is no need for a central determination of the integrity information and a corresponding dissemination to the satellites. In this way it is possible to further simplify the communication network for the dissemination of information to the satellites, since the only requirement is to configure the communication network in such a manner that the orbits and the clock parameters of the satellites can be determined, thus reducing even more the real time demands on the network.

Furthermore, the invention relates, according to an additional aspect, to a device for the efficient dissemination of information in a satellite navigation system, which includes a satellite system with a plurality of satellites, a network of observation stations for observing signals of the satellites, a central processing center for evaluating the observations of the observation stations and for generating information, based on the observations, for the dissemination to utilization systems, and a real time communication network for transmitting the observations from the observation stations to the central processing center.

Furthermore, the central processing center sends the information to the selected satellites, and upon receiving the information, each of the selected satellites sends this information to the neighboring satellites.

According to one aspect of the invention, the selected satellites may be a subset of the satellites, which are directly visible from the central processing center, from the plurality of satellites.

Furthermore, according to one aspect of the invention, a selected satellite can, upon receiving the information, send this information simultaneously to all of the satellites that are directly visible from the selected satellite.

According to an additional aspect of the invention, a selected satellite can also transmit the received information over an antenna, which has an antenna characteristic with a maximum in exactly or approximately the directions, in which the neighboring satellites are the farthest away. It may also be that the maximum of the antenna characteristic is adjusted only with respect to the elevation as a function of the distance from the other satellites.

Finally, according to one aspect of the invention, a selected satellite may also transmit the received information over an antenna that is mounted on the earth side of the satellite.

According to an additional aspect of the invention, a selected satellite may also transmit the received information over several antennas.

In a device, according to one aspect of the invention, each observation station may evaluate a received satellite signal or several satellite signals or all of the receivable satellite signals of the satellite system and send the information about the evaluation to all directly visible satellites, and each satellite may calculate, using the received information, its own integrity information and/or the integrity information for other satellites.

In an additional aspect, the invention relates to a satellite, for use with a device, that upon receiving the information from a central processing center, said device can transmit this information to neighboring satellites over an antenna, which is provided for this purpose.

One aspect of the invention provides that when the satellite antenna, which is provided for this purpose, is a horn antenna, which in the event of a special excitation in its center exhibits a minimum in the antenna characteristic and a maximum in exactly or approximately the directions, in which the neighboring satellites are the furthest away from the satellite.

Furthermore, according to one aspect of the invention, the antenna, which is provided for transmitting the information received from the central processing center, can be mounted on the earth side of the satellite.

In one aspect of the invention, solar collectors of the satellite may be designed in such a manner that they do not prevent the sending and receiving of information by way of the antenna, which is provided for transmitting the information received from the central processing center.

Finally, the satellite may exhibit, according to another aspect of the invention, a plurality of antennas, which are provided for transmitting the information received from the central processing center and which make possible the communication with satellites at other orbital altitudes.

Other advantages and potential applications of the invention under discussion are disclosed in the following description in conjunction with the embodiment depicted in the single drawing.

BRIEF DESCRIPTION OF THE DRAWING

The single drawing shows in the FIGURE a device for the efficient dissemination of information in a satellite navigation system according to one embodiment of the present invention.

The same elements and/or functionally identical elements are provided below with the same reference numerals.

DETAILED DESCRIPTION OF THE DRAWING

The FIGURE shows a satellite navigation system 10 comprising a plurality of satellites 12 and 26, as well as a network of observation stations 14. The network of the observation stations 14 forms together with a central processing center 18 for observations of the observation stations 14 an earth-based receiver for the satellite signals, which are transmitted by the satellite 12 and which exhibit the parameters of the transmitting satellites, such as the clock time of the high precision clock of the satellite at the time of the transmission of the signal, an unambiguous satellite identifier, data about the orbit of the satellite, integrity warnings and other information, which is important especially for finding the position by means of the satellite navigation system 10. The description also discloses the case of several redundant central processing centers (18). Moreover, the invention is described with respect to the case of a central processing center (18). However, the invention is not limited to this case.

The satellite navigation system 10 is designed for use by utilization systems 20 that are, for example, mobile navigation devices. A utilization system 20 evaluates the received satellite signals 16 for determining, as well known, the position of the utilization system 20. If a signal of a specific satellite contains an integrity warning, the utilization system knows that this signal is not suited for finding the exact position.

The integrity mechanism in a satellite system 10, such as Galileo, requires, as stated above, a commensurate ground-based infrastructure for determining the defective satellite signals and for dissemination of the corresponding integrity information in the satellite navigation system 10. In order to disseminate this information as fast and as efficiently as possible in the system 10, the system is implemented as follows.

The observation stations 14 continuously receive the satellite signals 16. In other words, the stations 14 observe the signals 16 in order to continuously receive and process the data streams that are transmitted by the individual satellites 12 with the satellite signals 16. The observations, which are carried out by the observation stations 14, may contain not only important information, which is included in the satellite signals 16, but also evaluations of the signals 16. The evaluations having already taken place in the observation stations 14, for example evaluations of the integrity information. The observations of the stations 14 are fed to a central processing center 18 of the system 10 over a communication network 22, in particular a real time communication network, for additional processing.

As a result, the central processing center 18 receives the observations of the stations 14 in real time and, based on these observations, can generate information 24, which in turn is to be transmitted to the satellites 12 and 26. To this end, the central processing center 18 sends the generated information 24, for example, a global integrity warning in the case of a plurality of defective satellite signals, to at least one satellite 26, which is selected from all of the satellites 12 and which is located directly in the visible range of the processing center 18. This at least one selected satellite 26 receives the information 24 from the central processing center. The effect of the reception of this information 24 in the selected satellite is that this selected satellite passes the information 24 to all of its neighboring satellites 12. However, in this case and in the following not just the nearest neighbors are meant. To this end, the selected satellite 26 includes suitable transmitters in the form of one special antenna or a plurality of special antennas, which are configured and designed in such a manner that they exhibit a radiation characteristic for beaming information 24 to the neighboring satellites 12 on the same orbit of the selected satellite 26 or also on other orbits.

Therefore, the present invention provides an approach for the dissemination of information in a satellite navigation system, in particular to the utilization systems (end users), in that the information is sent directly from a central processing center to selected satellites, and then the information is forwarded from satellite to satellite until finally an adequate number of satellites can send the information to the utilization systems in order to guarantee that the utilization systems can be properly provided with the information at an adequately high continuity.

In particular, the information is sent from the central processing center to a subset of the satellites that are directly visible from this central processing center. Then the selected satellites send the information simultaneously to all satellites that are visible from these satellites. This transmission can be done, for example, with a simple horn antenna, which in the event of a special excitation in the center has a minimum in the antenna characteristic, and which has a maximum in exactly or approximately the directions, in which the other navigation satellites are the furthest away. Moreover, the system can be optimized only with respect to the elevation, but not with respect to the azimuth. In this way, for example, in the case of Galileo the number of locations, from which information for the navigation has to be sent to the satellites, can be reduced from nine plus the number of central centers to the number of central centers.

If all of the satellites have approximately the same orbital altitude, the communication between the satellites can take place over antennas that are mounted on the earth side of the satellites. In this case it must be ensured that the solar collectors are designed in such a way that they do not prevent the transmission to other satellites and/or the reception from other satellites. Should the satellites be at significantly different orbital altitudes, then several antennas per satellite can be installed in order to propagate information in one direction.

The communication network, which centralizes the data of the individual observations (that is, transmits to the central processing center), can be reduced even more drastically, if the integrity information is not determined centrally by the central processing center, but rather in each individual satellite. To this end, one embodiment of the invention provides that the integrity relevant information that is measured by the observation stations is sent immediately again to all of the satellites that are visible from the observation stations. In this way each satellite can calculate its own integrity information, and the communication network can be designed in such a way that the orbits and the clock parameters can be determined, a procedure that no longer presents a difficult real time requirement.

In summary, the invention makes it possible to achieve an efficient dissemination of information in a satellite navigation system. Furthermore, the ground-based communication networks, which are expensive to operate and are part of a satellite navigation system, can be drastically reduced by means of the invention. In addition, the calculation of the integrity in satellites permits a significant reduction in the time until the warning.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS 10 satellite navigation system
12 satellite
14 observation station
16 satellite signal
18 central processing center
20 utilization system
22 communication network
24 information, generated by the central processing center 18
26 selected satellite

What is claimed is:

1. A method for the efficient dissemination of information in a satellite navigation system, which includes a satellite system comprising a plurality of satellites, the method comprising:

observing, by a network of observation stations, signals of the satellites;

evaluating, by one or more redundant central processing centers, the observations of the observation stations;

generating, by the one or more redundant central processing centers, information based on the observations for dissemination to utilization systems;

transmitting, by a communication network, the observations from the observation stations to the one or more redundant central processing centers;

sending, by the one or more redundant central processing centers, the information to selected satellites;

upon receiving the information, sending, by each of the selected satellites, the information to neighboring satellites, wherein at least one of the selected satellites transmits the received information over an antenna with an antenna characteristic with a maximum in directions in which neighboring satellites of the at least one of the selected satellites are farthest away.

2. The method of claim 1, wherein the selected satellites are a subset of the plurality of satellites, and the selected satellites are directly visible from the central processing center.

3. The method of claim 1, comprising:

upon receiving the information, sending, by another of the selected satellites, the information simultaneously to all satellites that are directly visible from the selected satellite.

4. The method of claim 1, comprising:

transmitting, by another of the selected satellites, the received information over an antenna that is mounted on an earth side of the satellite.

5. The method of claim 1, comprising:

transmitting, by another of the selected satellites, the received information over a plurality of antennas.

6. The method of claim 1, comprising:

evaluating, by each observation station, at least one received satellite signal of the satellite system;

sending, by each observation station, the information about the evaluation to all of the directly visible satellites; and calculating and propagating, by each satellite, with the aid of the received information, its own integrity information or integrity information for other satellites.

7. A satellite navigation system that efficiently disseminates information, comprising:

a satellite system, which comprises a plurality of satellites;

a network of observation stations that observe signals of the satellites;

one or more redundant central processing centers that evaluate the observations of the observation stations and generate information based on the observations that is disseminated to utilization systems; and a communication network that transmits the observations from the observation stations to the one or more redundant central processing centers, wherein the one or more redundant central processing centers send information to selected satellites, and upon receiving the information, each of the selected satellites sends this information to neighboring satellites, wherein at least one of the selected satellites transmits the received information over an antenna with an antenna characteristic with a maximum in directions in which the neighboring satellites are the farthest away.

8. The system of claim 7, wherein the selected satellites are a subset of the plurality of satellites, and the selected satellites are directly visible from the central processing center.

9. The system of claim 7, wherein upon receiving the information, another of the selected satellites sends this information simultaneously to all satellites that are directly visible from the selected satellite.

10. The system of claim 7, wherein another of the selected satellites transmits the received information over an antenna that is mounted on an earth side of the satellite.

11. The system of claim 7, wherein another of the selected satellites transmits the received information over a plurality of antennas.

12. The system of claim 7, wherein each observation station evaluates at least one received satellite signal of the satellite system and sends the information about the evaluation to all of the directly visible satellites, and each satellite calculates and propagates, using the received information, its own integrity information or the integrity information for other satellites.

13. The system of claim 7, wherein upon receiving the information from a central processing center, another of the selected satellites transmits the information to neighboring satellites over an antenna.

14. The system of claim 13, wherein the antenna is mounted on an earth side of the satellite.

15. The system of claim 13, wherein solar collectors of the satellite are arranged in such a manner that they do not prevent sending and receiving of information by way of the antenna with the central processing center.

16. The system of claim 13, wherein the satellite includes a plurality of antennas that are employed for transmitting the information received from the central processing center and for communication with satellites at other orbital altitudes.

17. The system of claim 7, wherein the antenna of the at least one selected satellites is a horn antenna, which in the event of a special excitation in its center exhibits a minimum in an antenna characteristic.

* * * * *